United States Patent
Peltonen (10) Patent No.: US 10,995,991 B2
(45) Date of Patent: May 4, 2021

(54) PROCESS FOR REDUCING RINGING IN LIME KILNS

(71) Applicant: Andritz Inc., Glens Falls, NY (US)

(72) Inventor: Kimmo Peltonen, Alpharetta, GA (US)

(73) Assignee: ANDRITZ INC., Alpharetta, GA (US)

( * ) Notice: Subject to any disclaimer, the term of this patent is extended or adjusted under 35 U.S.C. 154(b) by 354 days.

(21) Appl. No.: 16/133,365

(22) Filed: Sep. 17, 2018

(65) Prior Publication Data

US 2019/0093950 A1    Mar. 28, 2019

Related U.S. Application Data (60) Provisional application No. 62/564,087, filed on Sep. 27, 2017.

(51) Int. Cl.
| | | |
|---|---|---|
| *F27B 7/06* | (2006.01) | |
| *F27B 7/36* | (2006.01) | |
| *F27B 7/38* | (2006.01) | |
| *D21C 11/00* | (2006.01) | |

(52) U.S. Cl.
CPC .......... *F27B 7/362* (2013.01); *D21C 11/0064* (2013.01); *F27B 7/38* (2013.01); *F27B 2007/367* (2013.01)

(58) Field of Classification Search
CPC ..................................................... F27B 7/362
See application file for complete search history.

(56) References Cited

U.S. PATENT DOCUMENTS

| | | | |
|---|---|---|---|
| 2,301,855 A | | 11/1942 | Cliffe |
| 3,206,299 A | * | 9/1965 | Senior ..................... C21B 13/08 75/10.34 |
| D243,301 S | | 2/1977 | Ravn |
| 4,022,569 A | * | 5/1977 | Farago ..................... C10L 9/08 432/14 |
| 4,259,081 A | * | 3/1981 | Reuter .................... C04B 2/108 23/293 R |
| 4,354,829 A | | 10/1982 | Estes |
| 4,391,671 A | | 7/1983 | Azarniouch |
| 4,462,870 A | | 7/1984 | Wilson et al. |

(Continued)

FOREIGN PATENT DOCUMENTS

| | | |
|---|---|---|
| CA | 2947971 A1 | 12/2015 |
| CN | 100590357 | 2/2010 |

(Continued)

OTHER PUBLICATIONS

Karlsson, Lennart, Extended European Search Report, dated Feb. 11, 2019, pp. 1-8, European Patent Office, Munich, Germany.

(Continued)

*Primary Examiner* — Nathaniel Herzfeld
(74) *Attorney, Agent, or Firm* — Kilpatrick Townsend & Stockton LLP (57) ABSTRACT

This application discloses exemplary processes and systems for reducing mineral ring accumulation in calcination kiln. The processes and systems comprise inserting non-condensable gases ("NCGs") in a preheating zone of a calcination kiln, upstream of the burner end. The pre-heating zone may be characterized by temperatures ranging from 1,300° F. to 1,750° F. The system may desirably comprise a plenum for inserting the NCGs into the rotating calcination kiln at the pre-heating zone.

7 Claims, 6 Drawing Sheets

(56) References Cited

U.S. PATENT DOCUMENTS

| | | | |
|---|---|---|---|
| 4,767,323 | A | 8/1988 | Dilmore et al. |
| 4,919,726 | A * | 4/1990 | Rademachers ............ C09C 1/36 106/428 |
| 5,112,216 | A | 5/1992 | Tenn |
| 5,431,560 | A | 7/1995 | Helker et al. |
| 5,676,797 | A | 10/1997 | Barsin et al. |
| 6,116,896 | A | 9/2000 | Joshi et al. |
| 7,959,435 | B2 * | 6/2011 | Hansen ................... F27D 19/00 432/108 |
| 8,231,849 | B2 | 7/2012 | Lundahl et al. |
| 8,662,887 | B2 | 3/2014 | Cain et al. |
| 8,865,101 | B2 | 10/2014 | Rossi |
| 9,643,885 | B2 | 5/2017 | Vehmaan-Kreula |
| 2002/0021994 | A1 | 2/2002 | Blue et al. |
| 2008/0032247 | A1 | 2/2008 | Nolan et al. |
| 2009/0114352 | A1 | 5/2009 | Rossi |
| 2010/0244337 | A1 | 9/2010 | Cain et al. |
| 2011/0109021 | A1 | 5/2011 | Cain |
| 2016/0002852 | A1 | 1/2016 | Ruef et al. |

FOREIGN PATENT DOCUMENTS

| | | |
|---|---|---|
| CN | 102494535 | 6/2012 |
| CN | 101921072 | 7/2012 |
| CN | 203479036 | 3/2014 |
| CN | 106152809 | 11/2016 |
| EP | 2199717 | 6/2010 |
| EP | 2199718 | 6/2010 |
| WO | 2008027285 | 3/2008 |
| WO | 2009119291 | 10/2009 |
| WO | 2011000430 | 1/2011 |

OTHER PUBLICATIONS

L. Paul Johnson, el al., Collecting and Burning Noncondensible Gases, pp. 1-16.

Pierre Sullivan, et al., Effect of burning NCG on lime kiln flame patterns, Journal of Pulp and Paper Science, Jul. 2005, pp. 1-13.

Kauko Janka, Odor Control Recovery Boiler Furnace As Concentrated NCG Incinerator, Apr. 28, 2015, pp. 1-10.

Dan Banks, Problems With Kraft Pulp Mill Non-Condensible Gas Incinerators, Jul. 26, 1998, pp. 1-9, Tulsa, Oklahoma, United States.

Rolando Alberto Abarzua Jara, First Office Action, Chilean Patent Application No. 2722-2018, dated Jan. 14, 2020, pp. 1-14, Chile.

* cited by examiner

PROCESS FOR REDUCING RINGING IN LIME KILNS

CROSS-RELATED APPLICATION

This application claims the benefit under 35 U.S.C. § 119(e) of the earlier filing date of U.S. Provisional Patent Application No. 62/564,087 filed on Sep. 27, 2017, the entire contents of which are incorporated herein by reference.

BACKGROUND OF THE INVENTION

1. Technical Field

The present disclosure relates generally to pollution control and contaminant management in elongate rotary calcination kilns and more particularly to reducing nitrogen oxides ("$NO_x$") and diminishing mid-kiln mineral accumulation in lime mud kilns used for chemical recovery in the pulp and paper industry.

2. Related Art

There are several ways to produce pulp on an industrial scale, and producers tend to classify these methods into one of three general categories: chemical pulping, mechanical pulping, and hybrid pulping. Hybrid pulping involves different aspects of both chemical and mechanical pulping. Briefly, mechanical pulping often involves feeding lignocellulosic material (e.g. wood chips, bagasse, corn stover, recycled paper, or other material comprising the protein lignin and cellulosic polymers) through a series of refiner plates. The refiner plates grind the lignocellulosic material to the desired pulp grade. Mill operators may further process this pulp into a number of pulp-based products (e.g. paper, packaging material, absorbent filler, etc.); or the mill operators may sell the pulp wholesale.

In chemical processes, mill operators treat lignocellulosic material with either strong acids or strong bases to disassociate the lignin from the cellulosic fibers. Operators may then separate, wash, and further process the cellulosic fibers into pulp or other pulp-based products. Chemical process examples include the Kraft process (also known as the "sulfate process"), sulfite process, soda pulping process, and the sulfite semi-chemical pulping process.

While the processing chemicals for each type of chemical process may vary, mill operators frequently recover and recycle these process chemicals to operate the mill economically. In the Kraft process for example, mill operators cook the lignocellulosic material with "white liquor" in large pressurized digesters. The white liquor comprises sodium hydroxide (NaOH) and sodium sulfide ($Na_2S$). After cooking, a slurry of spent chemical liquor and rough pulp, having inconsistent particle sizes, exits the digester. The spent chemical liquor is commonly known as "black liquor" and comprises organic and inorganic compounds left over from the cooking process.

While the rough pulp is further processed, the chemical recovery process begins with isolating, concentrating, and then transferring the black liquor into a chemical recovery boiler. The chemical recovery boiler evaporates excess moisture and the inorganic compounds in the black liquor undergo pyrolysis. These inorganic compounds accumulate as molten salts ("smelt") at the bottom of the recovery boiler and eventually flow into an adjacent dissolving tank. The dissolving tank typically contains "weak wash" comprising the liquors used to wash lime mud and other precipitates. Upon contacting the weak wash, the smelt reacts and mixes with the weak wash to become "green liquor". The green liquor contains the first component of white liquor, sodium sulfide ($Na_2S$) and the byproduct sodium carbonate ($Na_2CO_3$).

Operators then clarify and feed the green liquor into an agitator and add calcium oxide, (CaO) and water. Calcium oxide is commonly known as "quicklime". The quicklime exothermically reacts with the water to produce calcium hydroxide, ($Ca(OH)_2$). The calcium hydroxide then reacts with the sodium carbonate in the green liquor to produce the other component of white liquor, sodium hydroxide (NaOH) and the byproduct calcium carbonate ($CaCO_3$). Calcium carbonate is commonly known as "lime mud".

At this stage, the lime mud precipitates out of the white liquor solution. Operators then clarify and transfer the white liquor to a storage tank to await reuse in the Kraft process. Meanwhile, operators wash and transfer the lime mud to a lime kiln for conversion back into quicklime (i.e. calcium oxide (CaO)). With the recycled quicklime, the mill operators may continue to treat green liquor and recover white liquor cost effectively.

A typical lime kiln consists of a long rotary cylindrical housing that defines a calcining kiln chamber. The housing is tilted relative to the ground. A burner is placed in the bottom end and an arrangement of chains is placed in the upper end. Lime mud comprising calcium carbonate ($CaCO_3$), sodium, and other impurities enters the kiln's upper end with a moisture content of about 20% to 30%. As the lime mud moves down the rotating housing toward the burner, the heat drives off the moisture and preheats the lime mud to reaction temperatures using the residual heat in the flue gases. The calcining reaction begins when the mud temperature reaches 1,400° F., but the reaction proceeds well only after the mud reaches 1800° F. The reclaimed quicklime may be cooled before exiting the bottom end of the kiln.

Chemical pulping also produces a variety of gaseous byproducts from several sources. These gaseous byproducts frequently contain sulfur compounds, including, thiols, which are odorous and can be toxic. Collectively, these gaseous byproducts can be referred to as "non-condensable gases" ("NCGs") and typically comprise "total reduced sulfur ("TRS") gases. The digester produces NCGs during cooking and flash tanks release NCGs when concentrating black liquor. Sources also include evaporators, turpentine systems, and condensate stripping systems. NCGs may include for example, sulfur compounds such as hydrogen sulfide ($H_2S$), methanethiol ($CH_4S$), dimethyl disulfide (($CH_3)_2S_2$), and dimethyl sulfide (($CH_3)_2S$). These NCGs are inserted into the lime kiln near the burner to oxidize the NCGs prior to exiting the kiln.

The chemical pulping process can also produce a number of condensable gases such as ammonia ($NH_3$), methanol ($CH_3OH$), and turpentine ($C_{10}H_{16}$). These condensable gases are also sometimes used as a fuel supplement in the lime kiln and may be added to the lime kiln at or near the burner.

Sodium in the lime mud may react with the sulfur compounds in the NCGs in complex chemistries to form mid-kiln rings that accumulate on the inner walls of the refractory material inside the kiln. These mid-kiln rings can create temperature pockets along the length of the kiln that adversely affect the calcining reaction. The mid-kiln rings also reduce the volume of the kiln and cause reactant accumulation upstream of the rings, which can lead to an incomplete calcining reaction and further ring growth. Additionally, the mid-kiln rings absorb heat from the kiln system, thereby encouraging the operators to expend more energy to achieve the same results.

Prior attempts to reduce ring formation involved cooling kiln sections in which rings were most likely to form, such as the lime kiln described in U.S. Pat. No. 4,767,323. The cooler kiln sections would freeze the molten slag and cause the frozen slag to spall off the wall due to differential thermal expansion. However, the spalled slag would fall into the lime bed and soon re-melt, thereby contaminating the lime product.

Additionally, elongate rotary calcination kilns produce nitrogen oxides ("$NO_x$"), including nitric oxide (NO), nitrous oxide ($N_2O$) and dinitrogen dioxide ($N_2O_2$. Nitrous oxide ($N_2O$) is "greenhouse gas" that reacts with air and ultraviolet ("UV") light to create nitric oxide (NO) and ozone ($O_3$) in the troposphere (i.e. the portion of the atmosphere where people live and breathe). UV light in the atmosphere can then convert nitric oxide (NO) back into nitrous oxide ($N_2O$), thereby establishing the foundation for further ozone ($O_3$) production. While the ozone layer in the stratosphere helpfully absorbs most UV radiation reaching Earth from space, ozone gas ($O_3$) is nonetheless a strong oxidizing agent that is toxic to humans. Furthermore, ozone ($O_3$) and $NO_x$ and additional pollutants in the troposphere contribute to acid rain. Accordingly, many governmental environmental protection agencies regulate the emissions of $NO_x$.

SUMMARY OF THE INVENTION

The problems of mid-kiln ring formation in an elongate rotary calcination kiln, such as a lime kiln, due to temperature fluctuations at the burner end and $NO_x$ emissions resulting from combustion of nitrogen and oxygen compounds in the elongate rotary calcination kiln are mitigated by introducing non-condensable gases ("NCGs") into the elongate rotary calcination kiln, at an insertion location, wherein a temperature at the insertion location is in a range of 212 degrees Fahrenheit ("° F.") to 2,200° F. (100 degrees Celsius ("° C.") to about 1,204.44° C.). Desirably, the NCGs are not inserted into a burner end of the elongate rotary calcination kiln. The insertion location is desirably in a "pre-heating zone" or in a separate "calcining zone". In another exemplary embodiment, the temperature at the insertion location may be in the range of 1,300° F. to about 1,750° F. (760° C. to about 954° C.). In other exemplary embodiments, the temperature at the insertion location may be below 1,300° F. to reduce thermal $NO_x$ further while still oxidizing the NCGs.

For reference, the elongate rotary calcination kiln comprises a kiln chamber having a burner end distally disposed from a feed end. The calcining zone begins at the burner end and may extend about 30% to about 40% the length of the elongate rotary calcination kiln. The calcining zone may have a temperature range of about 1,300° F. to about 2,200° F. The pre-heating zone of the elongate rotary calcination kiln is disposed downstream of the calcining zone relative to the burner end. The pre-heating zone may have a temperature range of about 212° F. to about 1,300° F. (100° C. to about 760° C.).

Without being bounded by theory, Applicant has discovered that by inserting NCGs into the elongate rotary calcination kiln downstream of the burner end at an insertion location having a temperature of about 212° F. to about 2,200° C. (preferably 1,300° F. to about 2,200° F.) that such a method reduces sporadic flame activity in the burner end, which in turn may reduce the freeze-thaw cycles that allow mid-kiln rings to grown from the refractory material toward the axis of the calcination kiln rotation. Injecting NCGs at such an insertion location may further allow the NCGs to mix with kiln gases and lower the temperature near the insertion location and downstream of the insertion location to thereby reduce $NO_x$ generation.

The exemplary method and system disclosed herein may further allow more precise temperature regulation within the calcination kiln chamber.

An exemplary elongate rotary calcination kiln system may comprise: a tubular housing having an outer shell and a refractory lining disposed within the outer shell. The refractory lining defines a kiln chamber; the kiln chamber has a burner end, a feed end distally disposed from the burner end, and a length extending between the burner end and the feed end. The exemplary system may further have a plenum annularly disposed around the tubular housing. The plenum may comprise a plenum housing. The plenum housing defines a plenum chamber annularly disposed around the tubular housing, and the plenum chamber fluidly communicates with the kiln chamber through an opening. The opening into the kiln chamber is disposed at about two-thirds the length of the kiln chamber as measured from the burner end at an insertion location where the kiln chamber temperature is in a range of 1,300° F. to 1,750° F. or 1,400° F. to 1,750° F., or 1,500° F. to 1,750° F. In this way, the plenum is configured to convey the NCGs into the pre-heating zone or calcining zone of the kiln chamber.

An exemplary process for reducing the accumulation of mid-kiln rings in an elongate rotary calcination kiln, particularly a lime kiln, may comprise: introducing NCGs into a chamber of a rotary lime kiln, through a plenum chamber annularly disposed around a tubular housing of the lime kiln. In the exemplary process, the plenum chamber fluidly communicates with the kiln chamber at an opening. The temperature of the kiln chamber can be in a range of 1,300° F. to 1,750° F. at the openings.

In still other exemplary embodiments, operators may add ammonia ($NH_3$) or urea ($CH_4N_2O$) downstream of the burner end to mitigate nitrous oxide ("$NO_x$") emissions.

It is contemplated that certain exemplary embodiments may allow mill owners to retrofit existing elongate rotary calcination kilns with the system described more fully herein.

BRIEF DESCRIPTION OF THE DRAWINGS

The foregoing will be apparent from the following more particular description of exemplary embodiments of the disclosure, as illustrated in the accompanying drawings in which like reference characters refer to the same parts throughout the different views. The drawings are not necessarily to scale, with emphasis instead being placed upon illustrating the disclosed embodiments.

DETAILED DESCRIPTION OF THE INVENTION

The following detailed description of the preferred embodiments is presented only for illustrative and descriptive purposes and is not intended to be exhaustive or to limit the scope and spirit of the invention. The embodiments were selected and described to best explain the principles of the invention and its practical application. One of ordinary skill in the art will recognize that many variations can be made to the invention disclosed in this specification without departing from the scope and spirit of the invention.

Corresponding reference characters indicate corresponding parts throughout the several views. Although the drawings represent embodiments of various features and components according to the present disclosure, the drawings are not necessarily to scale and certain features may be exaggerated in order to better illustrate embodiments of the present disclosure, and such exemplifications are not to be construed as limiting the scope of the present disclosure in any manner.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Although specific terms are used in the following description for the sake of clarity, these terms are intended to refer only to the particular structure of the embodiment selected for illustration in the drawings, and are not intended to define or limit the scope of the disclosure.

The singular forms "a," "an," and "the" include plural referents unless the context clearly dictates otherwise. Numerical values should be understood to include numerical values which are the same when reduced to the same number of significant figures and numerical values which differ from the states value by less than the experimental error of conventional measurement technique of the type described in the present application to determine the value.

All ranges disclosed herein are inclusive of the recited endpoint and are independently combinable (for example, the range "from 2 grams to 10 grams" is inclusive of the endpoints, 2 grams and 10 grams, and all intermediate values.

As used herein, approximating language may be applied to modify any quantitative representation that may vary without resulting in a change in the basic function to which it is related. Accordingly, a value modified by a term or terms, such as "about" and "substantially," may not be limited to the precise values specified. The modifier "about" should also be considered as disclosing the range defined by the absolute values of the two endpoints. For example, the expression "from about 212° F. to about 1,300° F." also discloses the range "from 212° F. to 1,300° F."

It should be noted that many of the terms used herein are relative terms. For example, the terms "upper" and "lower" are relative to each other in location, i.e. an upper component is located at a higher elevation than a lower component in a given orientation, but these terms can change if the device is flipped. The terms "inlet' and "outlet" are relative to a fluid flowing through them with respect to a given structure, e.g. a fluid flows through the inlet into the structure and flows through the outlet out of the structure. The terms "upstream" and "downstream" are relative to the direction in which a fluid flows through various components, i.e. the flow of fluids through an upstream component prior to flowing through the downstream component.

The terms "horizontal" and "vertical" are used to indicate direction relative to an absolute reference, i.e. ground level. However, these terms should not be construed to require structure to be absolutely parallel or absolutely perpendicular to each other. For example, a first vertical structure and a second vertical structure are not necessarily parallel to each other. The terms "top" and "bottom" or "base" are used to refer to locations/surfaces where the top is always higher than the bottom/base relative to an absolute reference, i.e. the surface of the Earth. The terms "upwards" and "downwards" are also relative to an absolute reference; an upwards flow is always against the gravity of the Earth.

The term "directly," wherein used to refer to two system components, such as valves or pumps, or other control devices, or sensors (e.g. temperature or pressure), may be located in the path between the two named components.

Figure 1:
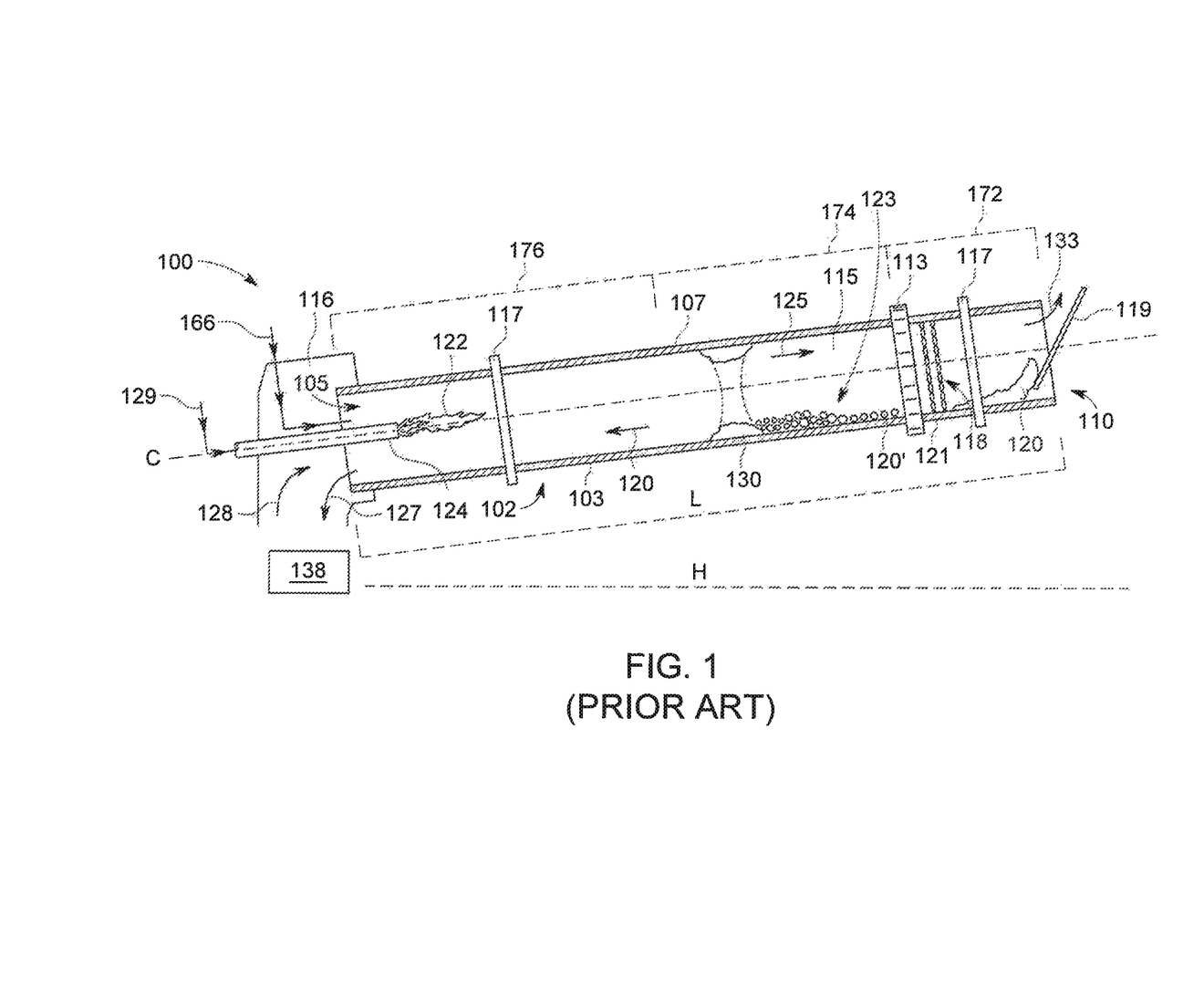
FIG. 1 is a cross-sectional schematic diagram of an exemplary elongate rotary calcination kiln comprising a plenum chamber disposed about two-thirds down the length of the calcining kiln chamber as measured from the burner end.

FIG. 1 is a cross-sectional schematic diagram of an elongate rotary calcination kiln 100. The elongate rotary calcination kiln 100 may be used to calcine lime, cement, magnesia, dolomite, titanium dioxide, and other calcined compounds. The elongate rotary calcination kiln 100 comprises a tubular housing 102. The tubular housing 102 is generally inclined at an angle of about 2° to about 5° from a horizontal line H. The tubular housing 102 can have an outer shell 103, usually fabricated from steel, and a refractory lining 107. The refractory lining 107 commonly comprises bricks, concrete, ceramics, or other materials that retain strength at kiln temperatures. The refractory lining 107 defines a kiln chamber 115. The kiln chamber 115 has a burner end 105 and a feed end 110 distally disposed from the burner end 105. The burner end 105 may be disposed in a kiln hood 116. The feed end 110 is sometimes known as the "cold end" and the burner end 105 is sometimes referred to as the "hot end" by those having ordinary skill in the art. A length L separates the burner end 105 from the feed end 110. Elongate rotary calcination kilns 100 can vary in size, but a typical elongate rotary calcination kiln 100 may be between about 200 feet to about 400 feet in length L.

The elongate rotary calcination kiln 100 further comprises a drive gear 113 and multiple riding rings 117 annularly engaged to the tubular housing 102. The riding rings 117 rest on rollers (326, FIG. 3) disposed on support blocks (247, FIG. 2). In operation, a motor (not depicted) rotates the drive gear 113 and thereby rotates the riding rings 117 and the elongate rotary calcination kiln 100 around a center rotational axis C. The elongate rotary calcination kiln 100 typically rotates at about one to two revolutions per minute.

A burner 124 is disposed at the burner end 105 of the kiln chamber 115. In operation, the burner 124 emits a flame jet 122 to heat the kiln chamber 115. Because the burner 124 is disposed only at the burner end 105, the burner distributes heat unevenly along the length L of the kiln chamber 115. This uneven beat distribution creates several temperature zones 172, 174, 176.

Operators may refer to the temperature zone starting at the feed end 110 as a "drying zone" 172. In the drying zone 172, heat from the flue gases 125 evaporates excess moisture in the calcine reactants 120 (i.e. lime mud when the elongate rotary calcination kiln 100 is a lime kiln). Because the drying zone 172 is configured to evaporate excess moisture, the lower end of drying zone's effective temperature range is typically the boiling point of water, i.e. 212 degrees Fahrenheit (° F.) or 100 degrees Celsius (° C.). A typical drying zone 172 may extend about 20% to about 30% of the length L of the elongate rotary calcination kiln 100 as measured from the feed end 110.

A preheating zone 174 is typically disposed between the drying zone 172 and the calcining zone 176. The preheating zone 174 typically has a temperature range of between 212° F. and 1,300° F. and 760° C.). Flue gases 125 heat the calcine reactants 120 in the preheating zone 174 and begin to form the calcine reactants 120 into larger nodules 120' (e.g. lime nodules). Generally, elongate rotary calcination kilns 100 process nodules 120' ranging in size from about 1 millimeter (mm) to about 50 mm. A typical preheating zone 174 may extend about 30% to about 40% of the length L of the elongate rotary calcination kiln 100 between the drying zone 172 and the calcining zone 176.

The calcining reaction primarily occurs in the calcining zone 176. The calcining zone 176 typically extends about 30% to about 40% the length L of the elongate rotary calcination kiln 100 as measured from the burner end 105. The calcining zone 176 typically has a temperature range of about 1,300° F. and 2,2000° F. (760° C. and 1,204.44° C.).

It will be understood by persons having ordinary skill in the art that the temperature zones 172, 174, 176 are presented for illustrative purposes and that the positions of the temperatures zones 172, 174, 176 may fluctuate over time given the burner output. However, the range of temperatures comprising each temperature zone 172, 174, 176 permits the location of each zone to be ascertained in operation. The lines depicted in FIG. 1 are included for elucidating the approximate locations of the temperature zones 172, 174, 176.

Natural gas or oil typically serve as primary burner fuels. However, to conserve the amount of available primary fuel and reduce costs, operators typically supplement the primary fuel with one or more auxiliary fuels 129. Some of these auxiliary fuels 129 are byproducts of pulp and paper production and chemical recovery of white liquor. Others auxiliary fuels 129 are used because the auxiliary fuels 129 are either inexpensive or readily available. Collectively, these auxiliary fuels 129 can include hazardous air pollutants ("HAPs") such as liquid methanol and turpentine. Furthermore, auxiliary fuels 129 may include hydrogen, tall oil, glycerol, low-volume, high concentration non-condensable gases ("LVHC NCGs," also known as "concentrated NCGs" or "CNCGs") produced from a pulp mill, stripper off gases ("SOG", another type of NCG) produced from an evaporation plant, petroleum coke, gasification gas (typically from biofuel such as bark, wood, etc.) biogas (typically methane and inert gases), gasification gas from coal, and liquid natural gas. It will be understood the auxiliary fuels 129 may include combinations of fuels.

Operators feed the auxiliary fuels 129 directly to the burner 124 or insert the auxiliary fuels 129 close to the flame jet 122 so that the auxiliary fuels 129 will combust near the burner end 105.

The burning of fuels creates "fuel $NO_x$" formed from the oxidation of already-ionized nitrogen in the primary and auxiliary burner fuels 129. "Thermal $NO_x$" describes $NO_x$ created through the combustion of nitrogen and oxygen compounds in a system.

Additionally, operators may feed low-concentration high volume non-condensable gases ("LCHV NCGs," also known as "dilute NCGs" or "DNCGs") 166 close to the flame jet 122 to oxidize these LCHV NCGs 166 prior to exiting the feed end 110 of the elongate rotary calcination kiln 100. The oxidation process reduces the amount of pollutants exiting the elongate rotary calcination kiln 100. Operators also burn low volume high concentration ("LVHC") gases in the kiln. These LVHC gases contain much higher concentrations of sulfur gases as well as vaporized methanol. LCHV NCGs typically contain only 5% to 6% NCG's by volume. These LCHV NCG's 166 typically comprise total reduced sulfur ("TRS") gases produced in the cooking and black liquor concentration processes. These TRS gases may include for example, sulfur compounds such as hydrogen sulfide ($H_2S$), methanethiol ($CH_4S$), dimethyl disulfide (($CH_3)_2S_2$), and dimethyl sulfide, (($CH_3)_2S$). TRS gases are corrosive and should not be used with carbon steel. NCGs are also highly toxic. TRS gases and the common HAPs methanol, and turpentine that may be present with NCGs, can explode in the presence of sufficient oxygen.

Generally, the calcine reactant 120 (e.g. lime mud in pulp and paper chemical recovery) enters the feed end 110 of the kiln chamber 115 and flow downwards toward the burner end 105. The calcine reactants 120 flow counter to the flow of flue gases 125. The flue gases 125 eventually exit the feed end 110 as exhaust gases 133. At the burner end 105, the re-burned product 127 (e.g. lime) exits the elongate rotary calcination kiln 100 at about 1,750° F. (954.44° C.). To reclaim some of the heat in the elongate rotary calcination kiln 100, many elongate rotary calcination kilns 100 have coolers 13$ proximate to the burner end 105. The cooler 138 may collect cool air 128 from the atmosphere and pass this cool air 128 over the exiting re-burned product 127. The hot re-burned product 127 pre-heats this cool air 128 before this secondary cool air 128 enters the kiln chamber 115 to maintain combustion.

When the elongate rotary calcination kiln 100 is a lime kiln, the calcine reactant 120 is lime mud. The lime mud typically has a moisture concentration of between 20% and 30% at the feed end 110. As the lime mud (see 120) flows toward the burner end 105, residual heat in the flue gases 125 evaporates the remaining moisture and preheats the lime mud (see 120). The calcining reaction begins when the lime mud temperature reaches 1,400° F. but the reaction proceeds well only after the lime mud (see 120) reaches 1,800° F. To transfer heat front the flue gases 125 to the lime mud (see 120) more efficiently, elongate rotary calcination kilns 100 typically have a chain section 118. The multiple chains 121 increase the surface area within the kiln chamber 115 exposed to the flue gases 125 and therefore increase the efficiency with which the heat from the flue gases 125 transfers to the lime mud (see 120).

As kiln chamber temperatures approach calcination temperatures of about 1,400° F. to over 1,800° F., the lime mud (see 120) plasticizes and pelletizes. When the calcine reactant 120 is lime rand, the calcining reaction generally proceeds as follows: $CaCO_3+heat \leftrightarrow CaO+CO_2$. The completeness of the calcining reaction is a function of the retention time and the temperature profile of the elongate rotary calcination kiln 100.

However, in practice, some of the pelletized lime mud ($CaCO_3$) (see 120) accumulates into larger nodules 120'. Over time, the lime dust adheres to and coats the refractory lining 107. As more lime dust accumulates on the refractory hung 107 and as the elongate rotary calcination kiln 100 continues to rotate, the lime mud (see 120) adhering to the refractory lining 107 forms a mid-kiln ring 130. Initially, a mid-kiln ring 130 is believed to contain both quick lime, (CaO) and lime mud ($CaCO_3$). This process can also create soda balls ranging in size from about 0.5 feet to about 2 feet. These soda balls are undesirable in part because the soda balls prevent the calcination reaction from proceeding efficiently.

Ring formation (see 130) increases precipitously between 150 feet and 200 feet when the flue gases have temperatures ranging from about 1,800° F. to about 1,700° F. and the temperature of the solid materials range from about 1,500° F. to about 1,150° F. Without being bounded by theory, it is believed the when the lime mud (see 120) reaches calcining temperatures in the preheating zone 174 and calcining zone 176, sodium compounds vaporize from the calcine reactant bed 123. Some of the sodium will condense on the sodium itself, thereby making a fume particle. Some of the sodium will stick to the lime. The molten sodium is believed to act as a "glue" that can attract further lime particles to stick together and to the refractory lining 107 of the elongate rotary calcination kiln 100. This sodium can combine with a CO anion. Re-carbonation and sulfation reactions will harden the agglomeration of lime being held together by the alkali "glue". Temperature fluctuations within the kiln chamber 115 create cycles of freezing and thawing. These freezing and thawing cycles deposit new overlapping layers of material in the same basic area, thereby gradually creating a large, structurally stronger ring formation. When the rate of erosion no longer equals the rate of deposition, the mid-kiln ring 130 grows and effectively reduces the diameter of the kiln chamber 115.

In a lime kiln (see 100), the size of the mid-kiln ring 130 was typically thought to be heavily dependent upon the lime mud's (see 120) sodium content. If operators do not periodically deactivate the elongate rotary calcination kiln 100 to remove these rings, the growing mid-kiln ring 130 eventually obstructs the kiln chamber 115, thereby rendering the elongate rotary calcination kiln 100 unusable without extended shutdown and maintenance.

Figure 2:
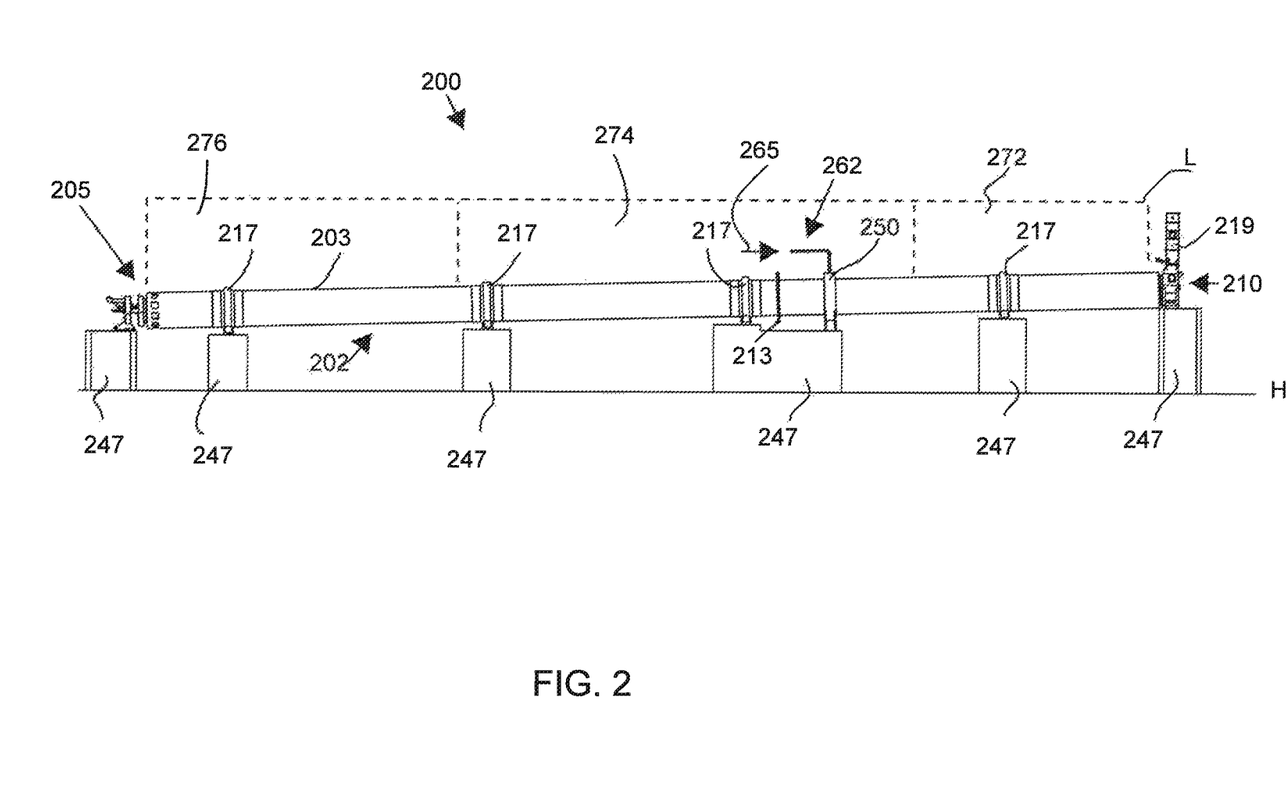
FIG. 2 is a side view of an exemplary elongate rotary calcination kiln showing a plenum chamber disposed at about two thirds the length of the calcining kiln chamber as measured form the burner end.

FIG. 2 is a side view of an exemplary elongate rotary calcination kiln 200 comprising a plenum 250 disposed about two-thirds the length L of the kiln chamber 115 from the burner end 205. The plenum 250 may be disposed annularly around the tubular housing 202 at the preheating zone 274 or calcining zone 276. Without being bounded by theory, it is believed that full oxidation of the NCGs can still occur in the preheating zone 274. In other exemplary embodiments, the plenum 250 may be disposed upstream of the drive gear 213. The kiln chamber 115 and tubular housing 202 may expand uphill and downhill from the drive gear 213. It may therefore be desirable to place the plenum 250 proximate to the drive gear 213, or to at least avoid areas of tubular housing 202 expansion to avoid inconsistent fittings between the plenum 250 and tubular housing 202 and possible deformations in the seal 357 (FIG. 3) connecting the plenum chamber 250 to the tubular housing 202.

In an exemplary process, operators feed NCGs 265 through an inlet conduit 262 leading to the plenum 250. Unless further specified, NCGs 265 may refer to LCHV NCGs, LVHC NCGs, SOGs, chip bin gases ("CBG") or combinations thereof. Without being bounded by theory, it may be desirable to insert primarily LCHV NCGs into the preheating zone 274 or the calcining zone 276. LCHV NCGs comprise about 5% to about 6% NCGs by volume. The remaining concentration is typically air. By inserting the LCHV NCGs at an insertion location (375, FIG. 3) where the temperature is lower than the temperature at or near the burner end 205, the exemplary system not only introduces the NCGs 265 at an area of reduced temperature, but the NCGs themselves, particularly LCHV NCGs may further reduce the temperature of the chamber 215 at or near the insertion location 375. This temperature reduction may disrupt the stoichiometric ratio that is conducive to $NO_x$ formation. That is, the injection of NCGs 265 into the pre-heating zone 274 or calcining zone 276 downstream of the burner end 205 may disrupt the exact ratio of nitrogen and oxygen compounds available to form $NO_x$ in part through diluting the calories available to react these nitrogen and oxygen compounds to form $NO_x$. Furthermore, by inserting the NCGs 265 downstream of the burner end 205, the exemplary system and process disclosed herein may further reduce the residence time of any $NO_x$-forming compounds present in, or injected with the NCGs 265, thereby further reducing the $NO_x$ capable of being created in the system. Furthermore, by oxidizing the NCGs 265 downstream of the burner end 205 rather than combusting the NCGs 265 in the burner flame 122, the exemplary systems and processes disclosed herein prevent a further source combustion necessary to create thermal $NO_x$ thereby contributing to an overall $NO_x$ reduction. NCGs collected from pulp mill processes are typically at a temperature of about 140° F. (60° C.) or cooler in transportation conduits. In certain exemplary embodiments, the collected NCGs 265 may feed directly into the kiln chamber 315 as the NCGs 265 are received from the mill sources (e.g. chemical digesters, chip bins, evaporators, and turpentine systems). In other exemplary embodiments, the NCGs 265 may be cooled to below 140° F. (60° C.) prior to being inserted into the kiln chamber (315, FIG. 3). In still other exemplary embodiments, the NCGs 265 may be heated to approximately the temperature of the kiln chamber 315 at the insertion location 375. For comparison, recirculated flue gas is generally in the range of 500° F. (260° C.) to 1,400° F. (760° C.) depending on where the flue gas is recirculated. In Andritz kilns for example, the recirculated flue gas generally has a temperature of between about 500° F. (260° C.) and 650° F. (about 343° C.).

Figure 3:
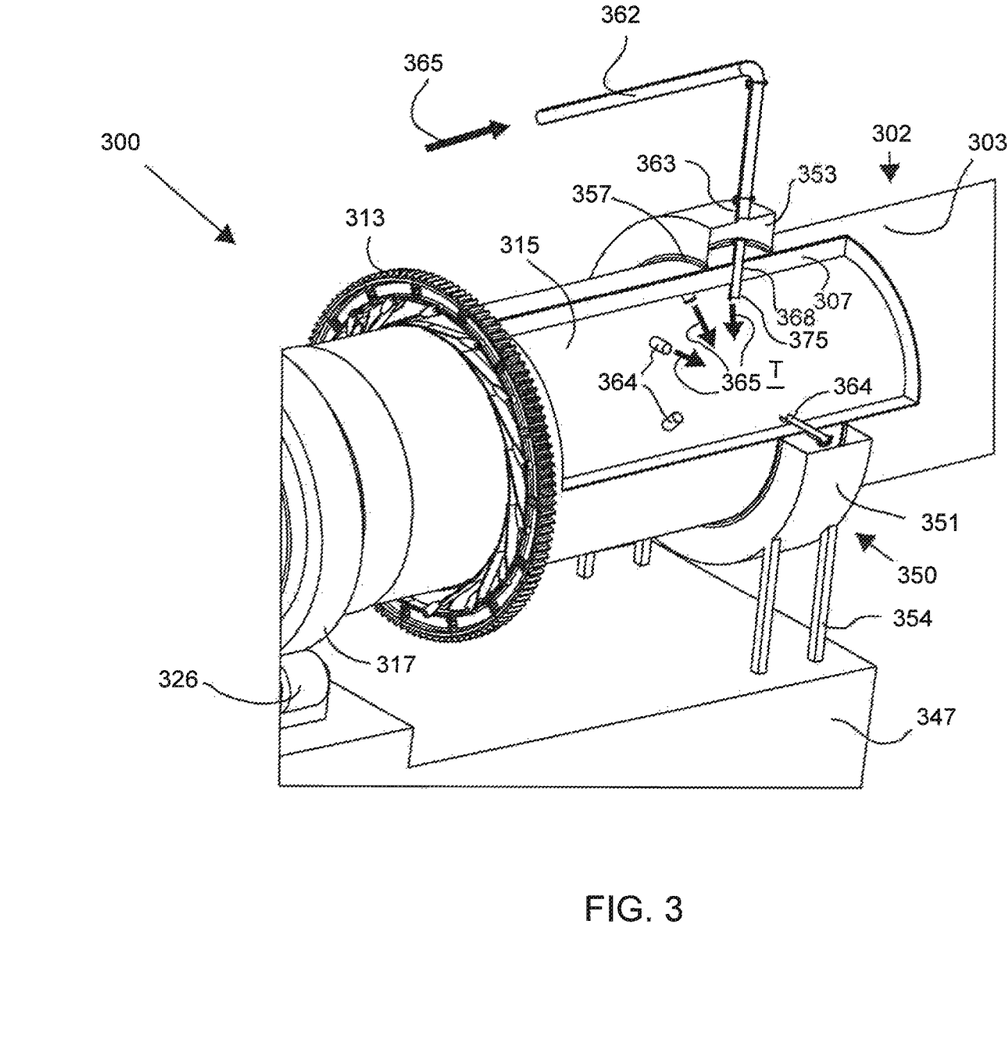
FIG. 3 is a perspective view of the plenum section of the exemplary system having a quarter cutaway depicting the manner in which the plenum chamber fluidly communicates with the calcining kiln chamber.

FIG. 3 is a perspective close-up view of the plenum 350 of an exemplary elongate rotary calcination kiln 300 disposed around the tubular housing 303. FIG. 3 shows a cutaway depicting the inside of the plenum 350 and the kiln chamber 315. The plenum 350 is annularly disposed around the elongate rotary calcination kiln 300 at about two thirds the length L of the kiln chamber 315 as measured from the burner end 205. The plenum 350 comprises a plenum housing 351. The plenum housing 351 defines a plenum chamber 353 annularly disposed around the outer shell 303 of the tubular housing 302. Seals 357 isolate the plenum chamber 353 from the outside atmosphere and allow the elongate rotary calcination kiln 300 to rotate while the plenum 350 remains stationary. Legs 354 may support the plenum 350 on the support block 347.

The plenum chamber 353 communicates with an inlet conduit 362 at a plenum inlet 363 defined by the plenum housing 351. The plenum chamber 353 further communicates with the kiln chamber 315 through one or more openings 368 in the tubular housing 302. A gas conduit 364 may extend through the opening 368. In other exemplary embodiments, the gas conduit 364 may be omitted. In operation, operators direct NCGs 365, preferably LVHC NCGs including total reduced sulfur ("TRS") gases, through the inlet conduit 362 into the plenum chamber 353. From the plenum chamber 353, the NCGs 365 diffuse into the kiln chamber 315 through the openings 368 and if present, the gas conduits 354. The NCG's 365 may enter the kiln chamber 315 at the preheating zone 274 or the calcining zone 276.

During operation, a temperature T at the insertion location 375 at which the NCGs 365 enter the kiln chamber 315 is between about 1,300° F. to 1,750° F. FIG. 3 depicts multiple openings 368 in the tubular housing 302 with a gas conduit 364 extending through each opening 368. In the depicted embodiment, it will be understood that that insertion location 375 is disposed at the kiln chamber end of the gas conduit 364. In exemplary embodiments lacking gas conduits 364, the insertion location 375 is just inside the kiln chamber 315 relative to the opening 368. It will be understood that in other exemplary embodiments, more than one plenum 350 may be disposed along the length L of the elongate rotary calcination kiln 300 provided that the additional plenums 350 are configured to introduce NCGs 356 at insertion locations 375 in the kiln chamber having a temperature T of about 212° F. to about 2,200° F. and preferably between about 1,300° F. and 1,750° F. Other structures suitable for injecting NCGs 365 into an elongate rotary calcination kiln 300 as described herein are considered to be within the scope of this disclosure.

Figure 4:
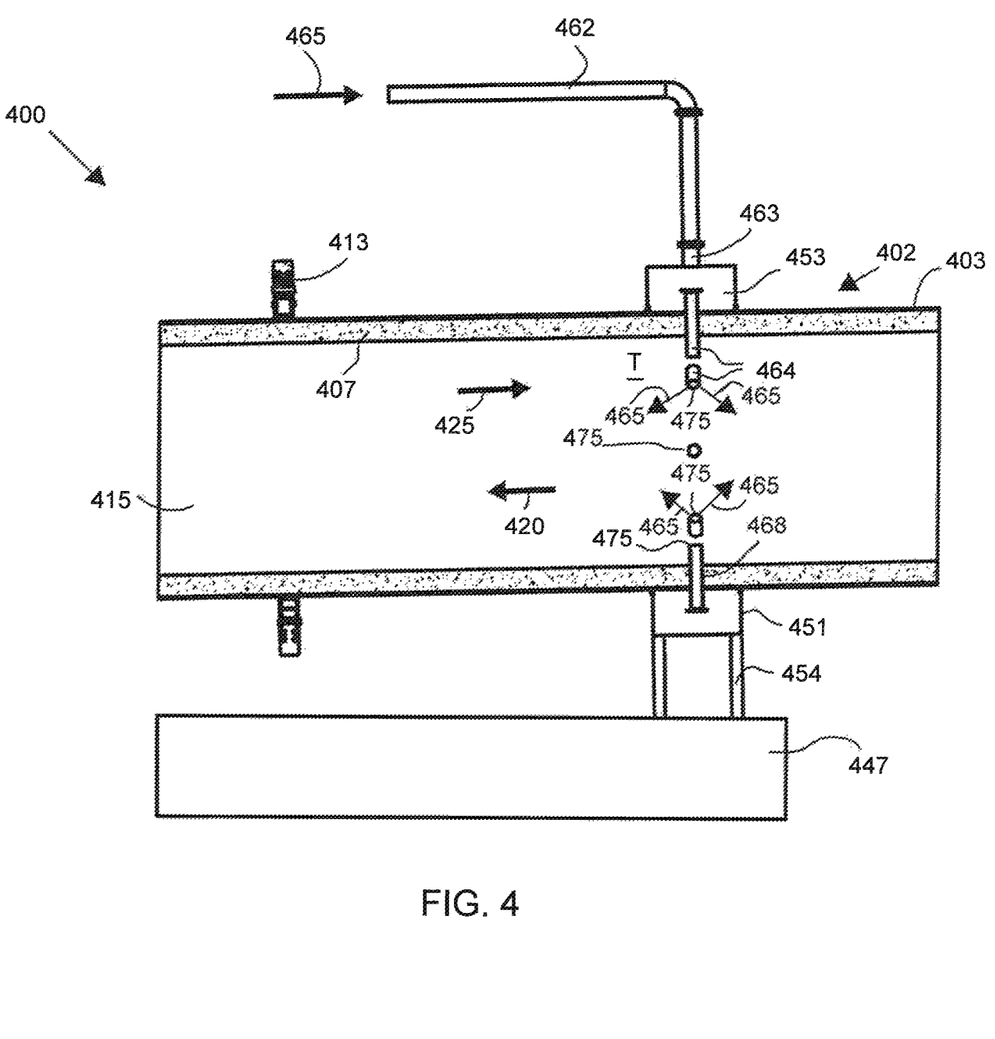
FIG. 4 is a side cross-sectional view of the plenum section of the exemplary system showing the insertion of non-condensable gases ("NCGs") downstream of the burner through the plenum.

FIG. 4 is a cross-sectional side view of the plenum section of an exemplary elongate rotary calcination kiln 400 shown in FIG. 3. Without being bounded by theory, Applicant has discovered that the variable composition of the TRS gases in the NCGs 465 causes temperature variations in the kiln chamber 415, which can disrupt the flame 122. The flow of NCGs 465 into the burner end 105 may cool the burner end 105 and thereby contribute to temperature fluctuations throughout the kiln chamber 415. Oxidizing NCGs 166 at the burner end (as shown in FIG. 1) may displace the oxygen that the burner 124 requires to maintain the flame 122. Without sufficient oxygen, the flame 122 will starve and contribute to "blowback". Blowback occurs when a diminished flame 122 ignites built-up pockets of combustible fuel. The sudden ignition of the built-up fuel can produce a small explosion that can render the elongate rotary calcination kiln 100 unsafe to nearby operators and contribute significantly to temperature fluctuations within the kiln chamber 415.

Applicant has discovered that by inserting the NCGs 465 into to pre-heating zone 274 or into the calcining zone 276, the temperatures of the pre-heating zone 274 and calcining zone 276 are sufficient to oxidize the NCGs 465 prior to the NCGs 465 exiting the feed end 210 of the elongate rotary calcination kiln 200, while moving the cooling effects of the NCGs 465 downstream of the middle of the elongate rotary calcination kiln 200 (relative to the burner end 205), and thereby bypassing the area of the elongate rotary calcination kiln 200 in which mid-kiln rings 130 are likely to form. By inserting NCGs 465 into a plenum 450 disposed about one half (½) to two thirds (⅔) the length L of the elongate rotary calcination kiln 200, Applicant has discovered a way to reduce temperature fluctuations at the burner end 205 and thereby bypass the freezing and thawing cycles that contributed to the creation of mid-kiln rings 130. With reduced temperature fluctuations, the nodules 120' are less likely to accumulate additional material at a faster rate than which the nodules 120' lose material, thereby obviating, the opportunity for mid-kiln rings 130 to form.

Inserting the NCOs 465 into the pre-heating zone 274 may further cool the flue gases 125 downstream of the pre-heating zone 274 (e.g. in the drying zone 272), thereby passively keeping the drying zone 272 below 1,300° and avoiding the accumulation of lime mud dust ($CaCO_3$) adhering to the refractory walls 407 into mid-kiln rings 130. The accumulation of lime mud on the refractory walls 107 due to successive freeze and thaw cycles is believed to be the impetus of mid-kiln ring 130 formation. The exemplary system thereby prevents the formation of mid-kiln rings 130 in the pre-heating zone 274. The elongate rotary calcination kiln 400 is less likely to produce $NO_x$ at temperatures below 1400° F.

In another exemplary embodiment, operators may add air (A, FIG. 6) to the plenum 450 in addition to NCG s 465. It is believed that the addition of air A can help control the temperature ranges within the elongate rotary calcination kiln 400 and further mitigate ringing and $NO_x$ production, particularly thermal $NO_x$ production.

In yet another exemplary embodiment, operators may inject urea ($CH_4N_2O$) into the plenum 450 to reduce the accumulation of nitrous oxides ($NO_x$) in the exhaust gases 633. (See FIG. 5). In yet another exemplary embodiment, operators may inject ammonia ($NH_3$) into the plenum 450 to reduce the accumulation of nitrous oxides ($NO_x$) in the exhaust gases 633. (See FIGS. 5 and 6).

Figure 5:
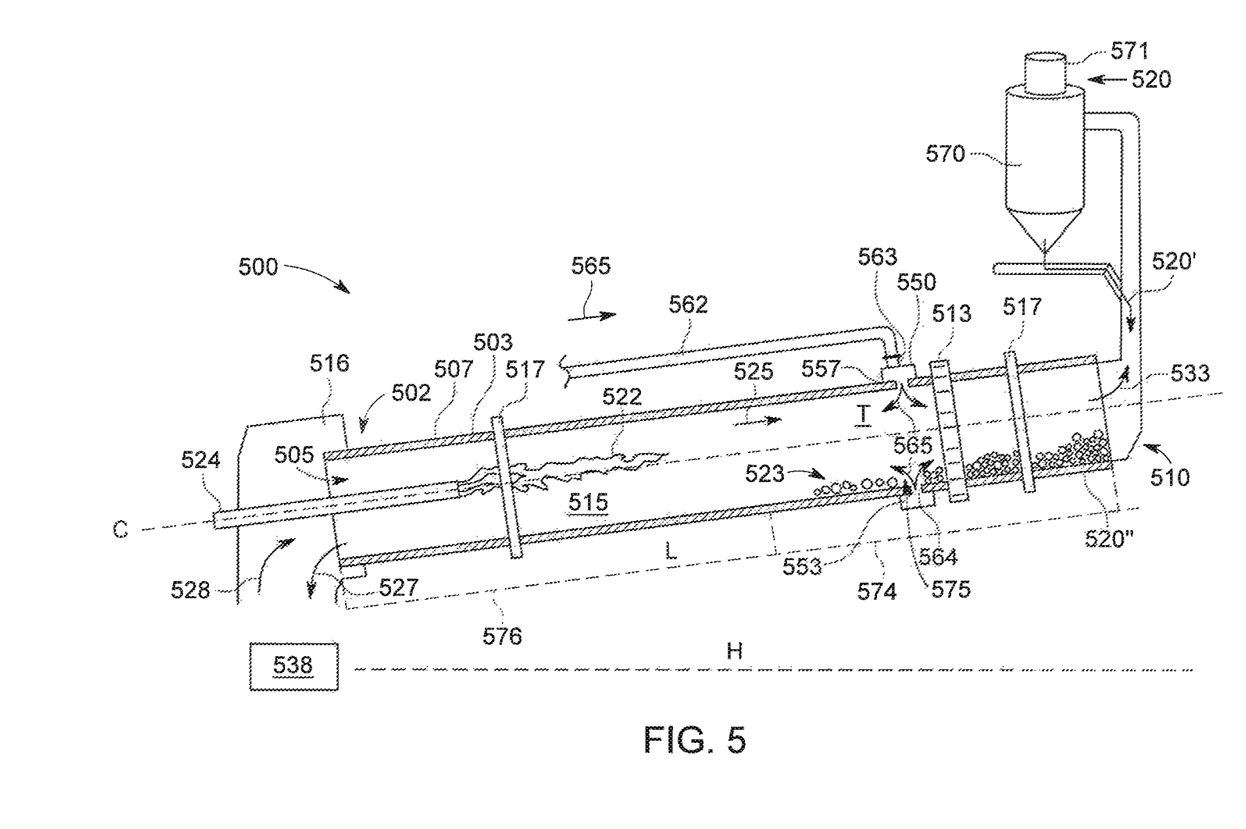
FIG. 5 is a cross-sectional schematic view of an exemplary elongate rotary calcination kiln system wherein the elongate rotary calcination kiln is a flash dryer kiln.

FIG. 5 is a cross-sectional schematic view of an exemplary elongate rotary calcination kiln system wherein the elongate rotary calcination kiln 200 is a flash dryer kiln 500. In a flash dryer kiln 500, a flash dryer 570 replaces the chain section 118 present in standard elongate rotary calcination kilns 100. The flash dryer 570 is typically disposed above the feed end 510. The flash dryer 570 replaces the drying zone 272 in the standard elongate rotary calcination kilns 100. The burner 524 and tubular housing 502 therefore define the calcining zone 576 and a preheating zone 574 in the kiln chamber 515 oldie tubular housing 502.

Prior to entering the flash dryer 570, operators typically dewater the calcine reactant 520 in a lime filter (not depicted). In FIG. 5, the calcine reactant is lime mud. The dewatered lime mud (see 520) will generally have a moisture content in a range of 20% to 30% when entering the flash dryer 570. In a flash drying process, operators feed lime mud (see 520) into the flash dryer 570 at an inlet 571. The lime mud (see 520) then briefly encounters exhaust gases 533 captured from the feed end 510 of the kiln chamber 515, The exhaust gases may exit the feed end 510 of the kiln chamber 515 in excess of 1292° F. (700° C.). The hot exhaust gases 533 rapidly evaporate excess moisture in the lime mud (see 520) without heating the lime mud (see 520) long enough to catalyze the calcining reaction. In this manner, the flash dryer 570 dries the lime mud 520". A cyclone separator 573 separates the dried lime mud 520" from the exhaust gases 533. The separated dried lime mud 520" is then fed into the feed end 510 of the elongate rotary calcination kiln 200 for preheating and calcination.

FIG. 5 depicts a plenum 550 disposed around the tubular housing 502 near the drive gear 513. The plenum 550 is disposed at an insertion location 575, wherein a temperature T of the kiln chamber 515 is in a range of 1300° F. to 1350° F. at the insertion location 575. Operators feed NCGs 565 into the plenum 550 at the insertion location 575 to reduce temperature fluctuations at the burner end 505 to thereby avoid the cyclic freezing and thawing of lime accumulations that contribute to the creation of mid-kiln rings 130.

Reduced temperature fluctuations in the kiln chamber 515, particularly in the calcining zone 576 and preheating zone 574 may permit the burner 524 and flame 522 to heat the kiln chamber 515 consistently thereby improving the throughput of calcine reactants 520 and the consistency of the re-burned product 527.

Figure 6:
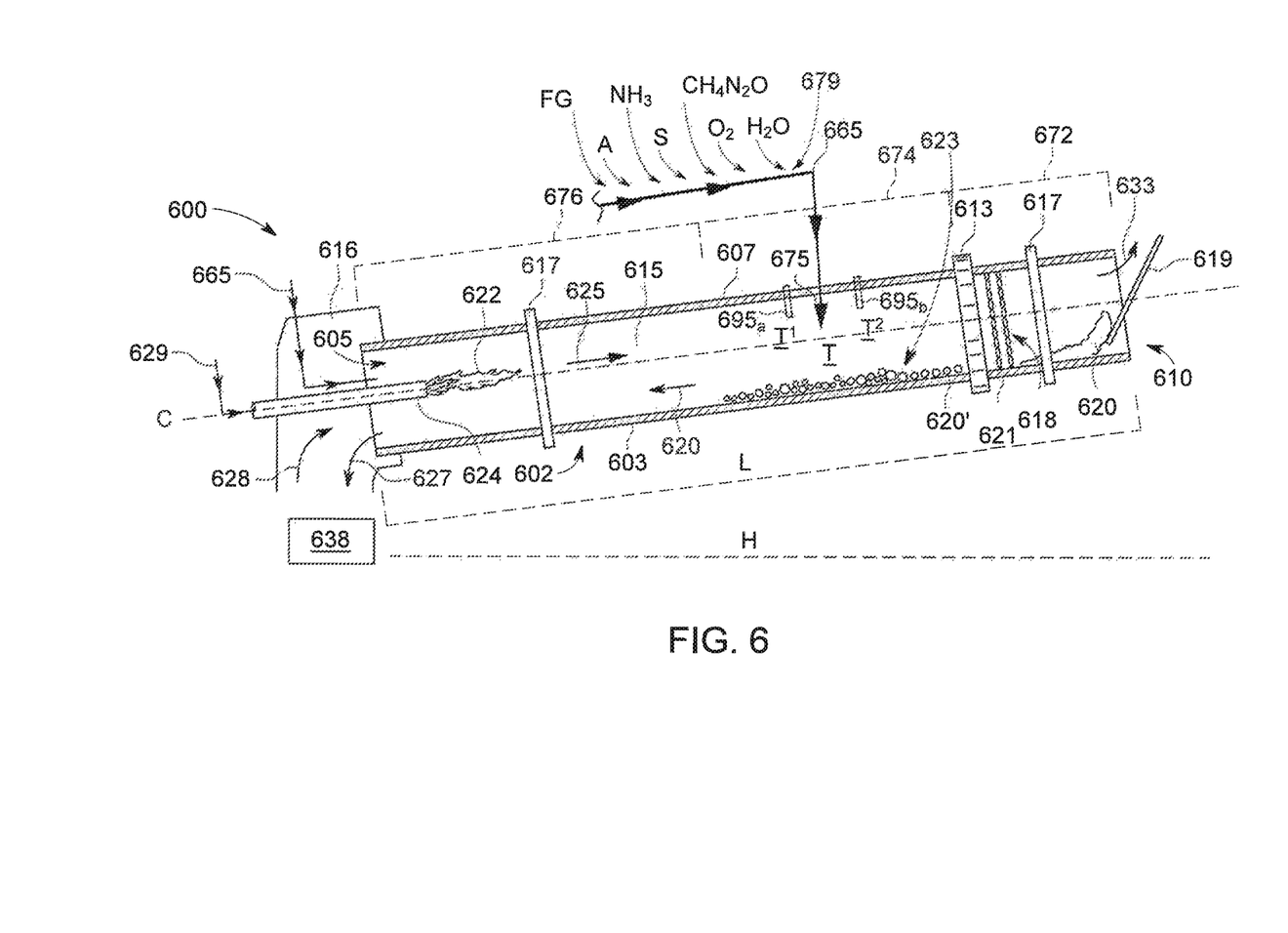
FIG. 6 is a cross-sectional schematic diagram depicting an exemplary method for reducing mid-kiln ring formation and an exemplary system further comprising a thermocouple.

FIG. 6 is a cross-sectional schematic representation of a process for reducing the accumulation of mid-kiln rings (sec 130) in an elongate rotary calcination kiln 600 comprising: introducing NCGs 665 into a elongate rotary calcination kiln 600, at an insertion location 675, wherein a temperature T of the kiln chamber 615 is in a range of 1,300° F. to 1350° F. at the insertion location 675, wherein the NCGs 665 are desirably not inserted into a burner end 605 of the elongate rotary calcination kiln 600. The insertion location 675 is desirably in the pre-heating zone 674 or the calcining zone 676.

In certain exemplary embodiments, operators may inject ammonia ($NH_3$) into the kiln chamber 615 at the insertion location 675 to reduce the accumulation of nitrous oxides ($NO_X$) in the exhaust gases 633 through selective catalytic reduction ("SCR"). In still other exemplary embodiments, operators may inject urea ($CH_4N_2O$) and ammonia ($NH_3$) into the kiln chamber 615 at the insertion location 675 to reduce the accumulation of nitrous oxides ($NO_X$) in the exhaust gases 633 through selective non-catalytic reduction ("SNCR"). In yet another exemplary embodiments, operators may add steam or water vapor ($H_2O$) at the insertion location 675 to help regulate the internal temperature and to help maintain the insertion locations of the temperature zones 672, 674, 676. It is contemplated that the emissions of sulfur oxides ("$SO_x$") may remain substantially unchanged.

In still other exemplary embodiments, operators may add sintering agents S with the NCGs 665 to reduce mid-kiln ring 130 formation further and to facilitate more frequent spalling of contaminants from the refractory walls 607. In yet other exemplary embodiments, operators may add oxygen ($O_2$) with the NCGs 665 to facilitate oxidation of the NCGs 665 near the insertion location 675. In still other exemplary embodiments, operators may insert air A with the NCGs 665 at the insertion location 675 to facilitate oxidation of the NCGs 665. In yet further exemplary embodiments, operators may recirculate flue gas FG at the insertion location 675. The flue gas FG may be cooled prior to insertion. In other exemplary embodiments, the flue gas FG may be oxygen-depleted. Without being bounded by theory, it is contemplated that the addition of flue gas FG, air A, water vapor ($H_2O$), or any combination thereof may dilute combustion energy needed to create $NO_X$. Water vapor ($H_2O$), water, cooled flue gas FG, and air A may be referred to generically as "cooling agents" 679 in this disclosure.

FIG. 6 also schematically depicts and exemplary system comprising an elongate rotary calcination kiln 600 having a burner end 605 distally disposed from a feed end 610. The elongate rotary calcination kiln 600 comprises an outer shell 603, and a refractory lining 607. The refractory lining 607 defines a kiln chamber 615 comprising multiple temperature zones 672, 674, 676. The exemplary system further comprises a temperature sensor 695 such as a thermocouple. The temperature sensor 695 detects the temperature T of kiln chamber 615 near the location of the temperature sensor 695. FIG. 6 depicts a first temperature sensor 695a and disposed upstream of the insertion location 675 (i.e. closer to the burner end 605) and a second temperature sensor 695b disposed downstream of the insertion location 675 (i.e. closer to the feed end 610). The temperature sensor 695 may signally communicate with a programmable logic controller ("PLC"), computer, tablet computer, or smart phone (generically, "processor"). The processors may send an output signal to a display to allow an operator to see or otherwise visualize the temperature readings.

An operator may adjust a process condition based on a reading from the temperature sensor 695 to maintain desirable operating conditions. In other exemplary embodiments, the processor may adjust a process condition automatically based upon readings from the temperature sensor 695. For example, if the temperature sensor 695 indicates that the temperature of the pre-treatment zone 674 is failing below desirable levels, the operator may increase the amount of fuel consumed by the burner 624 to increase the length of the flame 622 and thereby return the an area of the kiln chamber 615 to a desirable temperature T.

A further process for reducing the accumulation of kiln rings in an elongate rotary calcination kiln 600 may comprise: feeding a calcine reactant 620 into an elongate rotary calcination kiln 600 at a feed end 610 of the elongate rotary calcination kiln 600, oxidizing the calcine reactant 620 in the elongate rotary calcination kiln 600 with a burner 624 disposed at a burner end 605 of the elongate rotary calcination kiln 600, the burner end 605 being distally disposed form the feed end 610; and introducing NCGs 665 into the elongate rotary calcination kiln 600, through a plenum chamber 453, 553 annularly disposed around a tubular housing 602 of the elongate rotary calcination kiln 600, wherein the plenum chamber 453, 553 fluidly communicates with a kiln chamber 615 through an opening 668, and wherein a temperature T of the kiln chamber 615 is in a range of 1,300° F. to 1,750° F. at an insertion location 675.

Another exemplary process comprises: measuring a first temperature $T^1$ at a first location upstream of the insertion location 675, measuring a second temperature $T^2$ at a second location downstream of the insertion location 675, comparing the first temperature $I^1$ to the second temperature $T^2$ to determine the temperature difference, adding a cooling agent 679 with the NCGs 665 at an insertion location 675 when the temperature difference is less than 100° F., wherein the temperature T at the insertion location 675 is between 212° F. and 2,200° F. In other exemplary embodiments, the temperature T at the insertion location is between 1,300° F. and 1,750° F. An exemplary method may further comprise ceasing to add a cooling agent 679 when the temperature difference is 100° F. or greater. In still other exemplary embodiments, operators may add cooling agent 679 when the temperature difference reaches 100° F.

While this invention has been particularly shown and described with references to exemplary embodiments thereof, it will be understood by those skilled in the art that various changes in form and details may be made therein without departing from the scope of the invention encompassed by the appended claims.

What is claimed is:

1. A process for reducing the accumulation of mid-kiln rings in an elongate rotary calcination kiln, the process comprising:

introducing non-condensable gases (NCGs) into an elongate rotary calcination kiln having a burner end at a first end of a kiln chamber and a feed end at a second end of the kiln chamber distally disposed from the first end, wherein the NCGs are introduced at an insertion location downstream of the burner end toward the feed end in the kiln chamber, wherein a temperature of the kiln chamber at the insertion location is in a range of 212° F. to 2,200° F., and measuring a first temperature at a first location upstream of the insertion location toward the burner end of the kiln chamber, measuring a second temperature at a second location downstream of the insertion location toward the feed end of the kiln chamber, comparing the first temperature to the second temperature to calculate a temperature difference, adding a cooling agent with the NCGs at the insertion location when the temperature difference is less than 100° F.

2. The process of claim 1 further comprising not introducing the NCGs into the burner end of the elongate rotary calcination kiln.

3. The process of claim 1 further comprising introducing a compound at the insertion location with the NCGs, wherein the compound is selected from the group consisting of: air, ammonia, a sintering agent, urea, oxygen, re-circulated flue gas, and water vapor.

4. The process of claim 1, wherein the temperature at the insertion location is between about 1,300° F. and about 1,750° F.

5. The process of claim 1 further comprising ceasing to add the cooling agent when the temperature difference is 100° F. or greater.

6. The process of claim 1, wherein the insertion location comprises a pre-heating zone of the elongate rotary calcination kiln.

7. The process of claim 6, wherein the NCGs are introduced at the insertion location via a plenum annularly disposed around the elongate rotary calcination kiln at the pre-heating zone.

* * * * *

UNITED STATES PATENT AND TRADEMARK OFFICE
CERTIFICATE OF CORRECTION

PATENT NO. : 10,995,991 B2
APPLICATION NO. : 16/133365
DATED : May 4, 2021
INVENTOR(S) : Kimmo Peltonen It is certified that error appears in the above-identified patent and that said Letters Patent is hereby corrected as shown below:

On the Title Page

Item (57), in Column 2, in "Abstract", Line 5, delete "pre-heating" and insert -- preheating --.
Item (57), in Column 2, in "Abstract", Line 9, delete "pre-heating" and insert -- preheating --.

Signed and Sealed this
Eleventh Day of July, 2023

Katherine Kelly Vidal
*Director of the United States Patent and Trademark Office*